(12) United States Patent
Aisa et al.

(10) Patent No.: US 12,441,752 B2
(45) Date of Patent: Oct. 14, 2025

(54) PREPARATION METHOD FOR HIGH-PURITY GRANATIN A

(71) Applicant: XINJIANG TECHNICAL INSTITUTE OF PHYSICS & CHEMISTRY, CHINESE ACADEMY OF SCIENCES, Urumqi (CN)

(72) Inventors: Haji Akber Aisa, Urumqi (CN); Guangying Sun, Urumqi (CN); Guliqire Adili, Urumqi (CN); Munire Abuduaini, Urumqi (CN); Yongxin Zhao, Urumqi (CN)

(73) Assignee: XINJIANG TECHNICAL INSTITUTE OF PHYSICS & CHEMISTRY, CHINESE ACADEMY OF SCIENCES, Urumqi (CN)

( * ) Notice: Subject to any disclaimer, the term of this patent is extended or adjusted under 35 U.S.C. 154(b) by 497 days.

(21) Appl. No.: 17/925,613

(22) PCT Filed: Mar. 24, 2021

(86) PCT No.: PCT/CN2021/082510
§ 371 (c)(1),
(2) Date: Nov. 16, 2022

(87) PCT Pub. No.: WO2021/232932
PCT Pub. Date: Nov. 25, 2021

(65) Prior Publication Data
US 2023/0340004 A1    Oct. 26, 2023

(30) Foreign Application Priority Data
May 16, 2020 (CN) .......... 202010415738.X

(51) Int. Cl.
C07H 13/10    (2006.01)
C07H 1/06    (2006.01)

(52) U.S. Cl.
CPC .......... C07H 13/10 (2013.01); C07H 1/06 (2013.01)

(58) Field of Classification Search
CPC .......... C07H 13/10; C07H 1/06; C07H 1/08
See application file for complete search history.

(56) References Cited

FOREIGN PATENT DOCUMENTS

| CN | 111533768 A | 8/2020 |
|---|---|---|
| EP | 0297547 A2 | 1/1989 |

OTHER PUBLICATIONS

Guangying Sun, et al., "Two-dimensional" molecularly imprinted solid-phase extraction coupled with crystallization and high performance liquid chromatography for fast semi-preparative purification of tannins from pomegranate husk extract, Journal of Chromatography A, 2017, pp. 35-42, vol. 1505.

*Primary Examiner* — Layla D Berry
(74) *Attorney, Agent, or Firm* — Bayramoglu Law Offices LLC

(57) ABSTRACT

A method for preparing high-purity granatin A: by means of a combination of low-temperature liquid phase chromatography and an isomerization conversion purification method, using pomegranate peel extract as a source material, granatin A of over 98% purity can be acquired, and can be used as a standard product for quality control of pomegranate peel, pomegranate flower, or other medicinal material with granatin A as the active ingredient.

4 Claims, 1 Drawing Sheet

PREPARATION METHOD FOR HIGH-PURITY GRANATIN A

CROSS REFERENCE TO THE RELATED APPLICATIONS

This application is the national phase entry of International Application No. PCT/CN2021/082510, filed on Mar. 24, 2021, which is based upon and claims priority to Chinese Patent Application No. 202010415738.X, filed on May 16, 2020, which is incorporated herein by reference in its entirety.

TECHNICAL FIELD

The present invention relates to a method for preparing high-purity granatin A.

BACKGROUND

Chromatography, as a means of separation, is widely used in pharmaceutical, chemical and other fields in modern society. Due to the differences in adsorption force, partition coefficient, solubility and other principles, the target compound can be continuously distributed on the chromatographic column to form separable color bands (colorless substances will show different absorption peaks with a specific detector). Chromatography has a wide range of application, and the requirements for chromatography vary greatly depending on different needs. For special samples, it is very necessary to design and develop the corresponding separation technology to achieve the optimal separation effect.

Pomegranate, also known as Punica granatum, is a kind of fruit that is widely grown in China, especially in Xinjiang region (known as the Western Regions in ancient times). Both pomegranate peel and flowers can be used medicinally, which have the effects of stopping diarrhea, epistaxis, hematemesis and bleeding from trauma or the like, and can also be used in the treatment of leukorrhagia. When being used externally, they can treat otitis media. Pomegranate peel and flowers are rich in plant polyphenolic compounds which have a variety of antibacterial and anti-inflammatory activities. Wherein, granatin A is a main active component in pomegranate peel/flowers. Granatin A has an extremely poor stability, and impurities are easily generated during its separation process. There has been no purification method for high-purity granatin A in the world so far. In response to these characteristics, a low-temperature separation technique is developed to obtain high-purity granatin A references, which can be used for the declaration of National standard certificates and contribute to the quality control of pomegranate peel/flower or other medicinal materials with granatin A as the active ingredient.

SUMMARY

The present invention is intended to provide a method for preparing high-purity granatin A. In this method, a combination of low-temperature liquid phase chromatography and isomerization conversion purification method is employed, pomegranate flower extract is used as the source material, thereby granatin A references of over 98% purity can be acquired from the pomegranate peel extract. By this method, high-purity granatin A references are firstly acquired, which meets the declaration requirements of the national standards of granatin A and can contribute to the quality control of pomegranate peel/flower or other medicinal materials with granatin A as the active ingredient. This is of great significance to the research on the quality standard of medicinal materials containing granatin A. The granatin A acquired by the method of the present invention has the characteristics of high purity, high yield and high recovery rate, so that it can meet the declaration requirements of the national standards of granatin A. The corresponding purification process is much simpler than the traditional purification process of granatin A, with high purity, strong technical originality, and certain industrialization value.

The present invention provides a method for preparing high-purity granatin A, in which a mixture of methanol and formic acid-water is used as the mobile phase, a mixture of methanol-acetonitrile-formic acid-water is used as the mobile phase or a mixture of acetonitrile and formic acid-water is used as the mobile phase, respectively, with specific operations performed following the steps below:

using the mixture of methanol and formic acid-water as the mobile phase:

a. a reversed-phase C18 chromatographic column is connected to a high performance liquid phase chromatograph equipped with a dual-channel ultraviolet detector, and the wavelength of the high performance liquid phase chromatograph is adjusted to 254 nm and 366 nm, the column temperature is controlled at 30° C., and the flow rate is controlled at 180 mL/min; methanol and formic acid-water with a formic acid content of 0.1% are mixed through a solvent pump of the high performance liquid phase chromatograph and used as the mobile phase, wherein the content of methanol is 20%; the chromatographic column is equilibrated to a baseline level; 3 g of pomegranate peel extract is weighed and dissolved in 20 mL of water, centrifuged to remove the precipitate, and injected into the high performance liquid phase chromatograph for separation; a component of granatin A is collected, concentrated to 5 mL by a rotary evaporator at a temperature of 40° C., and freeze-dried under vacuum to get 230 mg of yellow solid powder;

b. a reversed-phase C18 chromatographic column is connected to a high performance liquid phase chromatograph equipped with a dual-channel ultraviolet detector, and the wavelength of the high performance liquid phase chromatograph is adjusted to 254 nm and 366 nm, the column temperature is controlled at 7 to −30° C., and the flow rate is controlled at 0.3 to 2.4 mL/min; methanol and formic acid-water with a formic acid content of 0.05% to 1.0% are mixed through a solvent pump of the high performance liquid phase chromatograph and used as the mobile phase, wherein the content of methanol is controlled at 15% to 50%; the chromatographic column is equilibrated to a baseline level; 5 to 40 mg of the part rich in granatin A obtained from step a is weighed, dissolved in 1 mL of the mobile phase, and injected into the chromatographic column for separation at low temperature; a first peak and a second peak of granatin A are separately collected, a component containing granatin A is collected, concentrated and dried by a rotary evaporator at a temperature of 30° C. to 50° C., and dissolved by adding 1 mL of the mobile phase for later use;

c. a reversed-phase C18 chromatographic column is connected to a high performance liquid phase chromatograph equipped with a dual-channel ultraviolet detector, and the wavelength of the high performance liquid phase chromatograph is adjusted to 254 nm and 366 nm, the column temperature is controlled at 7° C. to −30° C., and the flow rate is controlled at 0.3 to 2.4 mL/min; methanol and formic acid-water with a formic acid content of 0.05% to 1.0% are mixed through a solvent pump of the high performance liquid phase chromatograph and used as the mobile phase, wherein the content of methanol is controlled at 15% to 50%; the chromatographic column is equilibrated to a baseline level; a component containing the first peak obtained from step b is injected into the chromatographic column for separation at low temperature, and a second peak of granatin A is collected; a component containing the second peak obtained from step b is injected into the chromatographic column for separation at low temperature, and a first peak of granatin A is collected; the components of the two experiments are combined, concentrated and dried by a rotary evaporator at a temperature of 30° C. to 50° C., and dissolved by adding 1 mL of the mobile phase for later use;

d. a reversed-phase C18 chromatographic column is connected to a high performance liquid phase chromatograph equipped with a dual-channel ultraviolet detector, and the wavelength of the high performance liquid phase chromatograph is adjusted to 254 nm and 366 nm, the column temperature is controlled at 7° C. to −2° C., and the flow rate is controlled at 0.3 to 4.7 mL/min; acetonitrile and formic acid-water with a formic acid content of 0.05% to 1.0% are mixed through a solvent pump of the high performance liquid phase chromatograph and used as a mobile phase, wherein the content of acetonitrile is controlled at 10% to 30%; the chromatographic column is equilibrated to a baseline level; a component obtained from step c is injected into the chromatographic column for separation at low temperature; a component of granatin A is collected, concentrated to 1 mL by a rotary evaporator at a temperature of 30° C. to 50° C., and freeze-dried under vacuum to get high-purity granatin A as light yellow powder, the purity of which is identified by a high performance liquid phase chromatograph;

using the mixture of methanol-acetonitrile-formic acid-water as the mobile phase:

a. a reversed-phase C18 chromatographic column is connected to a high performance liquid phase chromatograph equipped with a dual-channel ultraviolet detector, and the wavelength of the high performance liquid phase chromatograph is adjusted to 254 nm and 366 nm, the column temperature is controlled at 30° C., and the flow rate is controlled at 180 mL/min; methanol and formic acid-water with a formic acid content of 0.1% are mixed through a solvent pump of the high performance liquid phase chromatograph and used as the mobile phase, wherein the content of methanol is 20%; the chromatographic column is equilibrated to a baseline level; 3 g of pomegranate peel extract is weighed and dissolved in 20 mL of water, centrifuged to remove the precipitate, and injected into the high performance liquid phase chromatograph for separation; a component of granatin A is collected, concentrated to 5 mL by a rotary evaporator at a temperature of 40° C., and freeze-dried under vacuum to get 230 mg of yellow solid powder, b. the wavelength of a DAD detector is adjusted to 254 nm and 366 nm, the flow rate is controlled at 0.3 to 2.4 mL/min, the column temperature is controlled at 7° C. to −30° C.; methanol, acetonitrile and formic acid-water with a formic acid content of 0.05% to 1.0% are mixed through a pump of the high performance liquid phase chromatograph and used as the mobile phase, wherein the content of methanol is controlled at 15% to 40%, the content of acetonitrile is controlled at 5% to 15%, and the content of formic acid-water is controlled at 55% to 80%; the chromatographic column is equilibrated to a baseline level; 5 to 40 mg of the part rich in granatin A obtained from step a is weighed, dissolved in 1 mL of the mobile phase, and injected into the chromatographic column for separation at low temperature; a first peak and a second peak of granatin A are separately collected, a component containing granatin A is collected, concentrated and dried by a rotary evaporator at a temperature of 30° C. to 50° C., and dissolved by adding 1 mL of the mobile phase for later use;

c. the wavelength of the high performance liquid phase chromatograph is adjusted to 254 nm and 366 nm, the flow rate is controlled at 0.3 to 2.4 mL/min, the column temperature is controlled at 7° C. to −30° C.; methanol, acetonitrile and formic acid-water with a formic acid content of 0.05% to 1.0% are mixed through a pump of the high performance liquid phase chromatograph and used as the mobile phase, wherein the content of methanol is controlled at 15% to 40%, the content of acetonitrile is controlled at 5% to 15%, and the content of formic acid-water is controlled at 55% to 80%; the chromatographic column is equilibrated for 10 to 40 min; a component containing the first peak obtained from step b is injected into the chromatographic column for separation at low temperature, and a second peak of granatin A is collected; a component containing the second peak obtained from step b is injected into the chromatographic column for separation at low temperature, and a first peak of granatin A is collected; the components of the two experiments are combined, concentrated and dried by a rotary evaporator at a temperature of 30° C. to 50° C., and dissolved by adding 1 mL of the mobile phase for later use;

d. a reversed-phase C18 chromatographic column is connected to a high performance liquid phase chromatograph equipped with a dual-channel ultraviolet detector, and the wavelength of the high performance liquid phase chromatograph is adjusted to 254 nm and 366 nm, the column temperature is controlled at 7° C. to −2° C., and the flow rate is controlled at 0.3 to 4.7 mL/min; acetonitrile and formic acid-water with a formic acid content of 0.05% to 1.0% are mixed through a solvent pump of the high performance liquid phase chromatograph and used as a mobile phase, wherein the content of acetonitrile is controlled at 10% to 30%; the chromatographic column is equilibrated to a baseline level; a component obtained from step c is injected into the chromatographic column for separation at low temperature; a component of granatin A is collected, concentrated to 1 mL by a rotary evaporator at a temperature of 30° C. to 50° C., and freeze-dried under vacuum to get high-purity granatin A as light yellow powder, the purity of which is identified by a high performance liquid phase chromatograph;

using the mixture of acetonitrile and formic acid-water as the mobile phase:

a. a reversed-phase C18 chromatographic column is connected to a high performance liquid phase chromatograph equipped with a dual-channel ultraviolet detector, and the wavelength of the high performance liquid phase chromatograph is adjusted to 254 nm and 366 nm, the column temperature is controlled at 30° C., and the flow rate is controlled at 180 mL/min; methanol and formic acid-water with a formic acid content of 0.1% are mixed through a solvent pump of the high performance liquid phase chromatograph and used as the mobile phase, wherein the content of methanol is 20%; the chromatographic column is equilibrated to a baseline level; 3 g of pomegranate peel extract is weighed and dissolved in 20 mL of water, centrifuged to remove the precipitate, and injected into the high performance liquid phase chromatograph for separation; a component of granatin A is collected, concentrated to 5 mL by a rotary evaporator at a temperature of 40° C., and freeze-dried under vacuum to get 230 mg of yellow solid powder;

b. the wavelength of the high performance liquid phase chromatograph is adjusted to 254 nm and 366 nm, the flow rate is controlled at 0.3 to 2.4 mL/min, the column temperature is controlled at 7° C. to −2° C.; acetonitrile and formic acid-water with a formic acid content of 0.05% to 1.0% are mixed through a pump of the high performance liquid phase chromatograph and used as the mobile phase, wherein the content of acetonitrile is controlled at 10% to 30%, and the content of formic acid-water is controlled at 70% to 90%; the chromatographic column is equilibrated to a baseline level; 5 to 40 mg of the part rich in granatin A obtained from step a is weighed, dissolved in 1 mL of the mobile phase, and injected into the chromatographic column for separation at low temperature; a first peak and a second peak of granatin A are separately collected, a component containing granatin A is collected, concentrated and dried by a rotary evaporator at a temperature of 30° C. to 50° C., and dissolved by adding 1 mL of the mobile phase for later use;

c. the wavelength of the high performance liquid phase chromatograph is adjusted to 254 nm and 366 nm, the flow rate is controlled at 0.3 to 2.4 mL/min, the column temperature is controlled at 7° C. to −2° C.; acetonitrile and formic acid-water with a formic acid content of 0.05% to 1.0% are mixed through a pump of the high performance liquid phase chromatograph and used as the mobile phase, wherein the content of acetonitrile is controlled at 10% to 30%, and the content of formic acid-water is controlled at 70% to 90%; the chromatographic column is equilibrated to a baseline level; a component containing the first peak obtained from step b is injected into the chromatographic column for separation at low temperature, and a second peak of granatin A is collected; a component containing the second peak obtained from step b is injected into the chromatographic column for separation at low temperature, and a first peak of granatin A is collected; the components of the two experiments are combined, concentrated and dried by a rotary evaporator at a temperature of 30° C. to 50° C., and dissolved by adding 1 mL of the mobile phase for later use;

d. a reversed-phase C18 chromatographic column is connected to a high performance liquid phase chromatograph equipped with a dual-channel ultraviolet detector, and the wavelength of the high performance liquid phase chromatograph is adjusted to 254 nm and 366 nm, the column temperature is controlled at 7° C. to −2° C., and the flow rate is controlled at 0.3 to 4.7 mL/min; acetonitrile and formic acid-water with a formic acid content of 0.05% to 1.0% are mixed through a solvent pump of the high performance liquid phase chromatograph and used as a mobile phase, wherein the content of acetonitrile is controlled at 10% to 30%; the chromatographic column is equilibrated to a baseline level; a component obtained from step c is injected into the chromatographic column for separation at low temperature; a component of granatin A is collected, concentrated to 1 mL by a rotary evaporator at a temperature of 30° C. to 50° C., and freeze-dried under vacuum to get high-purity granatin A as light yellow powder, the purity of which is identified by high performance liquid phase chromatography.

In step b, step c and step d when using the mixture of methanol and formic acid-water as the mobile phase, the content of formic acid in the formic acid-water is controlled at 0.1% to 0.3%.

In step b, step c and step d when using the mixture of methanol and formic acid-water as the mobile phase, using the mixture of methanol-acetonitrile-formic acid-water as the mobile phase or using the mixture of acetonitrile and formic acid-water as the mobile phase, the temperature for concentration is controlled at 30° C. to 37° C.

During the separation process when using the mixture of methanol and formic acid-water as the mobile phase or using the mixture of methanol-acetonitrile-formic acid-water as the mobile phase, the column temperature in step b and step c is controlled at −15° C. to −25° C., and the column temperature in step d is controlled at 2° C. to −2° C., or during the separation process when using the mixture of acetonitrile and formic acid-water as the mobile phase, the column temperature in step b and step c is controlled at 2° C. to −2° C., and the column temperature in step d is controlled at 2° C. to −2° C.

By using the method for preparing high-purity granatin A of the present invention in which a combination of low-temperature liquid phase chromatography and an isomerization conversion purification method is employed, and through the study of impurity generation mechanism, high-purity granatin A references are acquired from pomegranate peel extract. The granatin A acquired by this method has a purity over 98%, meeting the declaration requirements of the national standards of granatin A and can contribute to the quality control of pomegranate peel/flower or other medicinal materials with granatin A as the active ingredient. This is of great significance to the research on the quality standard of medicinal materials containing granatin A.

DETAILED DESCRIPTION OF THE EMBODIMENTS

Figure 1:
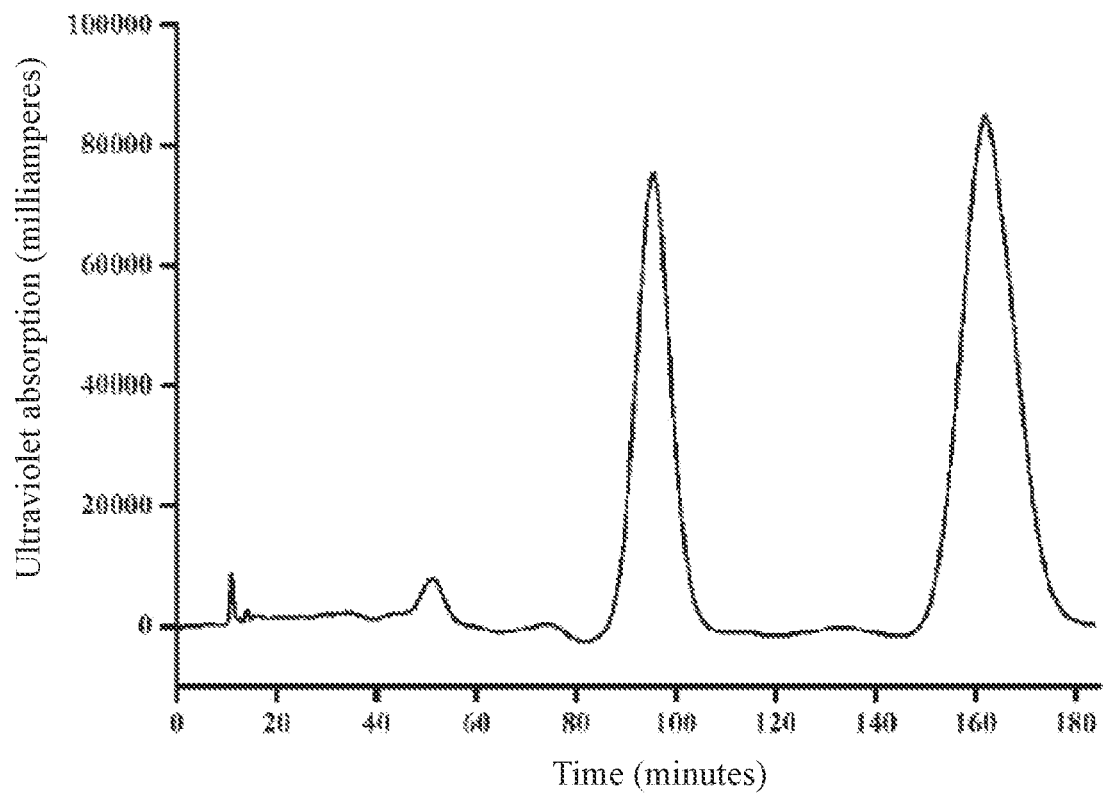
FIG. 1 is a schematic diagram of separation chromatography of pomegranate peel extract in step b in the present invention.

The present invention will be further described below in conjunction with specific embodiments.

Embodiment 1

Using the mixture of methanol and formic acid-water as the mobile phase:

a. a reversed-phase C18 chromatographic column (specification: length of 250 mm, diameter of 80 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at 30° C., and the flow rate was controlled at 180 mL/min; methanol and formic acid-water with a formic acid content of 0.1% were mixed through a solvent pump of the high performance liquid phase chromatograph and used as the mobile phase, wherein the content of methanol was 20%; the chromatographic column was equilibrated to a baseline level; 3 g of pomegranate peel extract was weighed, dissolved in 20 mL of water, centrifuged to remove the precipitate, and injected into the high performance liquid phase chromatograph for separation; a component of granatin A was collected, concentrated to 5 mL by a rotary evaporator at a temperature of 40° C., and freeze-dried under vacuum to get 230 mg of yellow solid powder;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −20° C., and the flow rate was controlled at 1.2 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; 5 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −20° C., and the flow rate was controlled at 1.2 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −2° C., and the flow rate was controlled at 1.2 ml/min; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 0.3 mg of high-purity granatin A as light yellow powder, which had a purity of 98.9% and a recovery rate of 7.5%.

Embodiment 2

Using the mixture of methanol and formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −20° C., and the flow rate was controlled at 0.3 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −20° C., and the flow rate was controlled at 0.3 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −2° C., and the flow rate was controlled at 0.3 ml/min; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 9.8 mg of high-purity granatin A as light yellow powder, which had a purity of 98.9% and a recovery rate of 30.6%.

Embodiment 3

Using the mixture of methanol and formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at 7° C., and the flow rate was controlled at 1.8 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; 20 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at 7° C., and the flow rate was controlled at 1.8 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at 7° C., and the flow rate was controlled at 2.5 ml/min; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 6.0 mg of high-purity granatin A as light yellow powder, which had a purity of 89.8% and a recovery rate of 33.7%.

Embodiment 4

Using the mixture of methanol and formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −30° C., and the flow rate was controlled at 1.2 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −30° C., and the flow rate was controlled at 1.2 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at 5° C., and the flow rate was controlled at 3.0 ml/min; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 9.2 mg of high-purity granatin A as light yellow powder, which had a purity of 99.1% and a recovery rate of 28.8%.

Embodiment 5

Using the mixture of methanol and formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −15° C., and the flow rate was controlled at 1.2 mL/min; methanol and formic acid-water with a formic acid content of 0.1% were mixed through a solvent pump of the high performance liquid phase chromatograph and used as the mobile phase, wherein the content of methanol was controlled at 30%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −15° C., and the flow rate was controlled at 1.2 mL/min; methanol and formic acid-water with a formic acid content of 0.1% were mixed through a solvent pump of the high performance liquid phase chromatograph and used as the mobile phase, wherein the content of methanol was controlled at 30%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −1° C., and the flow rate was controlled at 1.2 ml/min; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 10.6 mg of high-purity granatin A as light yellow powder, which had a purity of 96.5% and a recovery rate of 33.1%.

Embodiment 6

Using the mixture of methanol and formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −25° C., and the flow rate was controlled at 2.0 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −25° C., and the flow rate was controlled at 2.0 mL/min; methanol and formic acid-water with a formic acid content of 0.1% were mixed through a solvent pump of the high performance liquid phase chromatograph and used as the mobile phase, wherein the content of methanol was controlled at 15%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at 2° C., and the flow rate was controlled at 4.7 ml/min; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 9.5 mg of high-purity granatin A as light yellow powder, which had a purity of 99.1% and a recovery rate of 29.7%.

Embodiment 7

Using the mixture of methanol and formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −25° C., and the flow rate was controlled at 2.24 mL/min; methanol and formic acid-water with a formic acid content of 0.1% were mixed through a solvent pump of the high performance liquid phase chromatograph and used as the mobile phase, wherein the content of methanol was controlled at 50%; the chromatographic column was equilibrated for 20 min; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at −25° C., and the flow rate was controlled at 2.4 mL/min; methanol and formic acid-water with a formic acid content of 0.1% were mixed through a solvent pump of the high performance liquid phase chromatograph and used as the mobile phase, wherein the content of methanol was controlled at 50%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the column temperature was controlled at 6° C., and the flow rate was controlled at 1.2 ml/min; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 4.5 mg of high-purity granatin A as light yellow powder, which had a purity of 95.2% and a recovery rate of 14.1%.

Embodiment 8

Using the mixture of methanol-acetonitrile-formic acid-water as the mobile phase:
a. operating as in Embodiment 1;
b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 mL/min, and the column temperature was controlled at −20° C.; methanol, acetonitrile and formic acid-water with a formic acid content of 0.1% were mixed through a pump of the high performance liquid phase chromatograph and used as the mobile phase, wherein the content of methanol was controlled at 15%, the content of acetonitrile was 5%, and the content of formic acid-water was 80%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;
c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 mL/min, and the column temperature was controlled at −20° C.; methanol, acetonitrile and formic acid-water with a formic acid content of 0.1% were mixed through a pump of the high performance liquid phase chromatograph and used as the mobile phase, wherein the content of methanol was controlled at 15%, the content of acetonitrile was 5%, and the content of formic acid-water was 80%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;
d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 12.2 mg of high-purity granatin A as light yellow powder, which had a purity of 98.9/0 and a recovery rate of 38.1%.

Embodiment 9

Using the mixture of methanol-acetonitrile-formic acid-water as the mobile phase:
a. operating as in Embodiment 1;
b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 mL/min, and the column temperature was controlled at −30° C.; methanol, acetonitrile and formic acid-water with a formic acid content of 0.1% were mixed through a pump of the high performance liquid phase chromatograph and used as the mobile phase, wherein the content of methanol was controlled at 40%, the content of acetonitrile was 5%, and the content of formic acid-water was 55%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;
c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 ml/min, and the column temperature was controlled at −30° C.; methanol, acetonitrile and formic acid-water with a formic acid content of 0.1% were mixed through a pump of the high performance liquid phase chromatograph and used as the mobile phase, wherein the content of methanol was controlled at 40%, the content of acetonitrile was 5%, and the content of formic acid-water was 55%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at 7° C.; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 11.5 mg of high-purity granatin A as light yellow powder, which had a purity of 98.5% and a recovery rate of 35.9%.

Embodiment 10

Using the mixture of methanol-acetonitrile-formic acid-water as the mobile phase a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at 7° C.; methanol, acetonitrile and formic acid-water with a formic acid content of 0.1% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at 7° C.; methanol, acetonitrile and formic acid-water with a formic acid content of 0.1% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, the column temperature was controlled at −30° C., acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 13.2 mg of high-purity granatin A as light yellow powder, which had a purity of 98.1% and a recovery rate of 41.2%.

Embodiment 11

Using the mixture of acetonitrile and formic acid-water as the mobile phase:

a. operating as in Embodiment 1;

b. a reversed-phase C18 chromatographic column (specification: length of 250 mm, diameter of 80 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was 5%, and the content of formic acid-water was 95%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 80 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was 5%, and the content of formic acid-water was 95%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was 5%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 11.2 mg of high-purity granatin A as light yellow powder, which had a purity of 90.1% and a recovery rate of 31.5%.

Embodiment 12

Using the mixture of acetonitrile and formic acid-water as the mobile phase:

a. operating as in Embodiment 1;

b. a reversed-phase C18 chromatographic column (specification: length of 250 mm, diameter of 80 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at 7° C.; acetonitrile and formic acid-water with a formic acid content of 0.1% were mixed through a pump of the high performance liquid phase chromatograph and used as the mobile phase, wherein the content of acetonitrile was 15%, and the content of formic acid-water was 95%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 80 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at 7° C.; acetonitrile and formic acid-water with a formic acid content of 0.1% were mixed through a pump of the high performance liquid phase chromatograph and used as the mobile phase, wherein the content of acetonitrile was 15%, and the content of formic acid-water was 95%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 30° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was 15%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 30° C., and freeze-dried under vacuum to get 14.0 mg of high-purity granatin A as light yellow powder, which had a purity of 86.3% and a recovery rate of 37.8%.

Embodiment 13

Using the mixture of methanol-acetonitrile-formic acid-water as the mobile phase:
 a. operating as in Embodiment 1;
 b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 ml/min, and the column temperature was controlled at −20° C.; methanol, acetonitrile and formic acid-water with a formic acid content of 0.1% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;
 c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.2 ml/min, and the column temperature was controlled at −20° C.; methanol, acetonitrile and formic acid-water with a formic acid content of 0.1% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 50° C., and dissolved by adding 1 mL of the mobile phase for later use;
 d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 50° C., and freeze-dried under vacuum to get 12.8 mg of high-purity granatin A as light yellow powder, which had a purity of 96.5% and a recovery rate of 40.0%.

Embodiment 14

Using the mixture of methanol-acetonitrile-formic acid-water as the mobile phase:
 a. operating as in Embodiment 1;
 b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.0 ml/min, and the column temperature was controlled at −10° C.; methanol, acetonitrile and formic acid-water with a formic acid content of 0.1% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;
 c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.0 ml/min, and the column temperature was controlled at −10° C.; methanol, acetonitrile and formic acid-water with a formic acid content of 0.1% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.5 ml/min, and the column temperature was controlled at −1° C.; acetonitrile and formic acid-water with a formic acid content of 0.1% were mixed through a pump of the high performance liquid phase chromatograph and used as the mobile phase, wherein the content of acetonitrile was 30%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 13.4 mg of high-purity granatin A as light yellow powder, which had a purity of 98.3% and a recovery rate of 41.9%.

Embodiment 15

Using the mixture of methanol-acetonitrile-formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at 7° C.; methanol, acetonitrile and formic acid-water with a formic acid content of 0.05% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at 7° C.; methanol, acetonitrile and formic acid-water with a formic acid content of 0.05% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 4.7 ml/min, and the column temperature was controlled at 7° C.; acetonitrile and formic acid-water with a formic acid content of 0.05% were mixed through a pump of the high performance liquid phase chromatograph and used as the mobile phase, wherein the content of acetonitrile was 20%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 15 mg of high-purity granatin A as light yellow powder, which had a purity of 90.8% and a recovery rate of 42.6%.

Embodiment 16

Using the mixture of methanol-acetonitrile-formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.5 ml/min, and the column temperature was controlled at −15° C.; methanol, acetonitrile and formic acid-water with a formic acid content of 0.3% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.5 ml/min, and the column temperature was controlled at −15° C.; methanol, acetonitrile and formic acid-water with a formic acid content of 0.3% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 3.5 ml/min, and the column temperature was controlled at 5° C.; acetonitrile and formic acid-water with a formic acid content of 0.3% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 12.1 mg of high-purity granatin A as light yellow powder, which had a purity of 98.0% and a recovery rate of 37.0%.

Embodiment 17

Using the mixture of methanol-acetonitrile-formic acid-water as the mobile phase:
a. operating as in Embodiment 1;
b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.5 ml/min, and the column temperature was controlled at −30° C.; methanol, acetonitrile and formic acid-water with a formic acid content of 1.0% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.5 ml/min, and the column temperature was controlled at −30° C.; methanol, acetonitrile and formic acid-water with a formic acid content of 1.0% were mixed through a pump of the high performance liquid phase chromatograph and used as the mobile phase, wherein the content of methanol was controlled at 20%, the content of acetonitrile was 15%, and the content of formic acid-water was 65%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C. and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 4.0 mL/min, and the column temperature was controlled at 1° C.; acetonitrile and formic acid-water with a formic acid content of 1.0% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 10.7 mg of high-purity granatin A as light yellow powder, which had a purity of 96.4% and a recovery rate of 32.1%.

Embodiment 18

Figure 2:
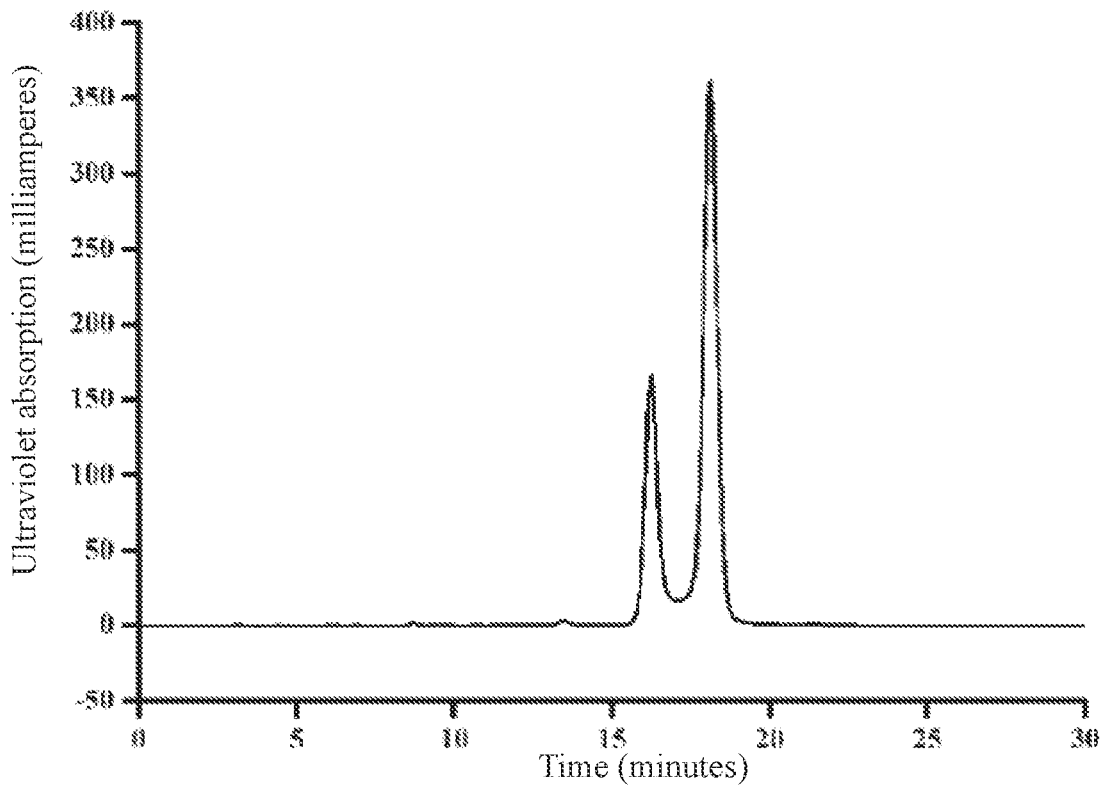
FIG. 2 is a diagram showing the purity of granatin A obtained in step d as determined by liquid phase chromatography in the present invention.

Using the mixture of methanol-acetonitrile-formic acid-water as the mobile phase:
a. operating as in Embodiment 1;
b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.8 ml/min, and the column temperature was controlled at 1° C.; methanol, acetonitrile and formic acid-water with a formic acid content of 0.2% were mixed through a pump of the high performance liquid phase chromatograph and used as the mobile phase, wherein the content of methanol was controlled at 30%, the content of acetonitrile was 5%, and the content of formic acid-water was 65%; the chromatographic column was equilibrated to a baseline level; 40 mg of the part rich in granatin A obtained from step a was weighed, dissolved in 1 mL of the mobile phase, and injected into the chromatographic column for separation at low temperature; as shown in FIG. 1, a first peak and a second peak of granatin A were separately collected, a component containing granatin A was collected, concentrated and dried by a rotary evaporator at a temperature of 30° C., and dissolved by adding 1 mL of the mobile phase for later use;
c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.8 ml/min, and the column temperature was controlled at 1° C.; methanol, acetonitrile and formic acid-water with a formic acid content of 0.2% were mixed through a pump of the high performance liquid phase chromatograph and used as the mobile phase, wherein the content of methanol was controlled at 30%, the content of acetonitrile was 5%, and the content of formic acid-water was 65%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;
d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.8 ml/min, and the column temperature was controlled at 2° C.; acetonitrile and formic acid-water with a formic acid content of 0.2% were mixed through a pump of the high performance liquid phase chromatograph and used as the mobile phase, wherein the content of acetonitrile was 15%, and the content of formic acid-water was 85%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 13.5 mg of high-purity granatin A as light yellow powder, which had a purity of 99.1% and a recovery rate of 42.2% as shown in FIG. 2.

Embodiment 19

Using the mixture of methanol-acetonitrile-formic acid-water as the mobile phase:
a. operating as in Embodiment 1;
b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at −20° C.; methanol, acetonitrile and formic acid-water with a formic acid content of 1.0% were mixed through a pump of the high performance liquid phase chromatograph and used as the mobile phase, wherein the content of methanol was controlled at 30%, the content of acetonitrile was 5%, and the content of formic acid-water was 65%; the chromatographic column was equilibrated to a baseline level; 40 mg of the part rich in granatin A obtained from step a was weighed, dissolved in 1 mL of the mobile phase, and injected into the chromatographic column for separation at low temperature; as shown in FIG. 1, a first peak and a second peak of granatin A were separately collected, a component containing granatin A was collected, concentrated and dried by a rotary evaporator at a temperature of 30° C., and dissolved by adding 1 mL of the mobile phase for later use;
c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at −20° C.; methanol, acetonitrile and formic acid-water with a formic acid content of 0.1% were mixed through a pump of the high performance liquid phase chromatograph and used as the mobile phase, wherein the content of methanol was controlled at 30%, the content of acetonitrile was 5%, and the content of formic acid-water was 65%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was 15%, and the content of formic acid-water was 85%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 12.4 mg of high-purity granatin A as light yellow powder, which had a purity of 97.6% and a recovery rate of 38.8% as shown in FIG. 2.

Embodiment 20

Using the mixture of methanol-acetonitrile-formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at −30° C.; methanol, acetonitrile and formic acid-water with a formic acid content of 0.1% were mixed through a pump of the high performance liquid phase chromatograph and used as the mobile phase, wherein the content of methanol was controlled at 30%, the content of acetonitrile was 12%, and the content of formic acid-water was 58%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at −30° C.; methanol, acetonitrile and formic acid-water with a formic acid content of 1.0% were mixed through a pump of the high performance liquid phase chromatograph and used as the mobile phase, wherein the content of methanol was controlled at 30%, the content of acetonitrile was 12%, and the content of formic acid-water was 58%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 4.7 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was 15%, and the content of formic acid-water was 85%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 11.1 mg of high-purity granatin A as light yellow powder, which had a purity of 94.9% and a recovery rate of 32.9%.

Embodiment 21

Using the mixture of methanol-acetonitrile-formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at 5° C.; methanol, acetonitrile and formic acid-water with a formic acid content of 0.1% were mixed through a pump of the high performance liquid phase chromatograph and used as the mobile phase, wherein the content of methanol was controlled at 15%, the content of acetonitrile was 15%, and the content of formic acid-water was 70%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at 5° C.; methanol, acetonitrile and formic acid-water with a formic acid content of 0.1% were mixed through a pump of the high performance liquid phase chromatograph and used as the mobile phase, wherein the content of methanol was controlled at 15%, the content of acetonitrile was 15%, and the content of formic acid-water was 70%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at 7° C.; acetonitrile and formic acid-water with a formic acid content of 1.0% were mixed through a pump of the high performance liquid phase chromatograph and used as the mobile phase, wherein the content of acetonitrile was 15%, and the content of formic acid-water was 85%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 10.1 mg of high-purity granatin A as light yellow powder, which had a purity of 94.1% and a recovery rate of 29.7%.

Embodiment 22

Using the mixture of methanol-acetonitrile-formic acid-water as the mobile phase:

a. operating as in Embodiment 1;

b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at 7° C.; methanol, acetonitrile and formic acid-water with a formic acid content of 0.1% were mixed through a pump of the high performance liquid phase chromatograph and used as the mobile phase, wherein the content of methanol was controlled at 40%, the content of acetonitrile was 5%, and the content of formic acid-water was 55%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;

c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at 7° C.; methanol, acetonitrile and formic acid-water with a formic acid content of 0.1% were mixed through a pump of the high performance liquid phase chromatograph and used as the mobile phase, wherein the content of methanol was controlled at 40%, the content of acetonitrile was 5%, and the content of formic acid-water was 55%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;

d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at −2° C.; acetonitrile and formic acid-water with a formic acid content of 1.0% were mixed through a pump of the high performance liquid phase chromatograph and used as the mobile phase, wherein the content of acetonitrile was 15%, and the content of formic acid-water was 85%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 12.8 mg of high-purity granatin A as light yellow powder, which had a purity of 96.8% and a recovery rate of 38.7%.

Embodiment 23

Using the mixture of acetonitrile and formic acid-water as the mobile phase:
a. operating as in Embodiment 1;
b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was controlled at 10%, and the content of formic acid-water was 90%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;
c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 2.4 ml/min, and the column temperature was controlled at −2° C.; acetonitrile and formic acid-water with a formic acid content of 0.1% were mixed through a pump of the high performance liquid phase chromatograph and used as the mobile phase, wherein the content of acetonitrile was controlled at 10%, and the content of formic acid-water was 90%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 35° C., and dissolved by adding 1 mL of the mobile phase for later use;
d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 4.7 ml/min, and the column temperature was controlled at −2° C.; acetonitrile and formic acid-water with a formic acid content of 1.0% were mixed through a pump of the high performance liquid phase chromatograph and used as the mobile phase, wherein the content of acetonitrile was 10%, and the content of formic acid-water was 90%; the chromatographic column was equilibrated to a baseline level; a component obtained from step c was injected into the chromatographic column for separation at low temperature; a component of granatin A was collected, concentrated to 1 mL by a rotary evaporator at a temperature of 35° C., and freeze-dried under vacuum to get 14.3 mg of high-purity granatin A as light yellow powder, which had a purity of 87.1% and a recovery rate of 38.9%.

Embodiment 24

Using the mixture of acetonitrile and formic acid-water as the mobile phase:
a. operating as in Embodiment 1;
b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.0 ml/min, and the column temperature was controlled at 7° C.; acetonitrile and formic acid-water with a formic acid content of 0.1% were mixed through a pump of the high performance liquid phase chromatograph and used as the mobile phase, wherein the content of acetonitrile was controlled at 30%, and the content of formic acid-water was 70%; the chromatographic column was equilibrated to a baseline level; 40 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;
c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 1.0 ml/min, and the column temperature was controlled at 7° C.; acetonitrile and formic acid-water with a formic acid content of 0.1% were mixed through a pump of the high performance liquid phase chromatograph and used as the mobile phase, wherein the content of acetonitrile was controlled at 20%, and the content of formic acid-water was 80%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;
d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 4.7 ml/min, and the column temperature was controlled at 2° C.; acetonitrile and formic acid-water with a formic acid content of 1.0% were mixed through a pump of the high performance liquid phase chromatograph and used as the mobile phase, wherein the content of acetonitrile was 30%, and the content of formic acid-water was 70%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 14.1 mg of high-purity granatin A as light yellow powder, which had a purity of 85.4% and a recovery rate of 37.6%.

Embodiment 25

Using the mixture of acetonitrile and formic acid-water as the mobile phase:
a. operating as in Embodiment 1;
b. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at 2° C.; acetonitrile and formic acid-water with a formic acid content of 0.1% were mixed through a pump of the high performance liquid phase chromatograph and used as the mobile phase, wherein the content of acetonitrile was controlled at 20%, and the content of formic acid-water was 80%; the chromatographic column was equilibrated to a baseline level; 20 mg of the part rich in granatin A obtained from step a was weighed, dissolved in 1 mL of the mobile phase, and injected into the chromatographic column for separation at low temperature; a first peak and a second peak of granatin A were separately collected, a component containing granatin A was collected, concentrated and dried by a rotary evaporator at a temperature of 30° C., and dissolved by adding 1 mL of the mobile phase for later use;
c. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 0.3 ml/min, and the column temperature was controlled at 2° C.; acetonitrile and formic acid-water with a formic acid content of 0.1% were mixed through a pump of the high performance liquid phase chromatograph and used as the mobile phase, wherein the content of acetonitrile was controlled at 20%, and the content of formic acid-water was 80%; the chromatographic column was equilibrated to a baseline level; a component containing the first peak obtained from step b was injected into the chromatographic column for separation at low temperature, and a second peak of granatin A was collected; a component containing the second peak obtained from step b was injected into the chromatographic column for separation at low temperature, and a first peak of granatin A was collected; the components of the two experiments were combined, concentrated and dried by a rotary evaporator at a temperature of 37° C., and dissolved by adding 1 mL of the mobile phase for later use;
d. a reversed-phase C18 chromatographic column (specification: length of 250 mm, diameter of 10 mm, filler particle size of 10 μm) was connected to a high performance liquid phase chromatograph equipped with a dual-channel ultraviolet detector (also known as a DAD detector), and the wavelength of the DAD detector was adjusted to 254 nm and 366 nm, the flow rate was controlled at 4.7 ml/min, and the column temperature was controlled at 7° C.; acetonitrile and formic acid-water with a formic acid content of 1.0% were mixed through a pump of the high performance liquid phase chromatograph and used as the mobile phase, wherein the content of acetonitrile was 30%, and the content of formic acid-water was 70%; the chromatographic column was equilibrated to a baseline level; a component obtained from step c was injected into the chromatographic column for separation at low temperature; a component of granatin A was collected, concentrated to 1 mL by a rotary evaporator at a temperature of 37° C., and freeze-dried under vacuum to get 3.8 mg of high-purity granatin A as light yellow powder, which had a purity of 95.4% and a recovery rate of 19.4%.

Embodiment 26

Any one of granatin A of embodiments 1-25 can be used as a reference for the determination of the content of granatin A in medicinal materials rich in granatin A, such as pomegranate peel and pomegranate flower, wherein granatin A of over 98% purity meets the declaration requirements of the national standards of granatin A and can contribute to the quality control of pomegranate peel/flower or other medicinal materials with granatin A as the active ingredient. This is of great significance to the research on the quality standard of medicinal materials containing granatin A.

Finally, it should be noted that the above embodiments are intended only to illustrate the technical solutions of the present invention rather than limiting them. Although the present invention has been described in detail with reference to the embodiments, those of ordinary skill in the art should understand that any modification or equivalent replacement of the technical solutions of the present invention will not depart from the spirit and scope of the technical solutions of the present invention, and should be encompassed within the scope of the claims of the present invention.

What is claimed is:
1. A method for preparing high-purity granatin A, comprising: using a mixture of methanol and formic acid-water as a first mobile phase, using a mixture of methanol-acetonitrile-formic acid-water as a second mobile phase, or using a mixture of acetonitrile and the formic acid-water as a third mobile phase, respectively, with specific operations performed following the steps below:

using the mixture of the methanol and the formic acid-water as the first mobile phase:

a1. a reversed-phase C18 chromatographic column is connected to a high performance liquid phase chromatograph equipped with a dual-channel ultraviolet detector, and a wavelength of the high performance liquid phase chromatograph is adjusted to 254 nm and 366 nm, a column temperature is controlled at 30° C., and a flow rate is controlled at 180 mL/min; the methanol and the formic acid-water are mixed through a solvent pump of the high performance liquid phase chromatograph and used as the first mobile phase, wherein a content of the methanol is 20%, and a formic acid content in the formic acid-water is 0.1%; the reversed-phase C18 chromatographic column is equilibrated to a baseline level, 3 g of a pomegranate peel extract is weighed and dissolved in 20 mL of water, centrifuged to remove a precipitate, and injected into the high performance liquid phase chromatograph for a separation; a first component of granatin A is collected, concentrated to 5 mL by a rotary evaporator at a temperature of 40° C., and freeze-dried under a vacuum to get 230 mg of a yellow solid powder;

b1. the reversed-phase C18 chromatographic column is connected to the high performance liquid phase chromatograph equipped with the dual-channel ultraviolet detector, and the wavelength of the high performance liquid phase chromatograph is adjusted to 254 nm and 366 nm, the column temperature is controlled at 7° C. to −30° C., and the flow rate is controlled at 0.3 mL/min to 2.4 mL/min; the methanol and the formic acid-water are mixed through the solvent pump of the high performance liquid phase chromatograph and used as the first mobile phase, wherein the content of the methanol is controlled at 15% to 50%, and the formic acid content in the formic acid-water is 0.05% to 1.0%; the reversed-phase C18 chromatographic column is equilibrated to the baseline level; 5 mg to 40 mg of a part rich in the granatin A obtained from step a1 is weighed, dissolved in 1 mL of the first mobile phase, and injected into the reversed-phase C18 chromatographic column for the separation; a first peak and a second peak of the granatin A are separately collected to respectively obtain a second component and a third component, concentrated and dried by the rotary evaporator at a temperature of 30° C. to 50° C., and dissolved by adding 1 mL of the first mobile phase for a later use;

c1. the reversed-phase C18 chromatographic column is connected to the high performance liquid phase chromatograph equipped with the dual-channel ultraviolet detector, and the wavelength of the high performance liquid phase chromatograph is adjusted to 254 nm and 366 nm, the column temperature is controlled at 7° C. to −30° C., and the flow rate is controlled at 0.3 mL/min to 2.4 mL/min; the methanol and the formic acid-water are mixed through the solvent pump of the high performance liquid phase chromatograph and used as the first mobile phase, wherein the content of the methanol is controlled at 15% to 50%, and the formic acid content in the formic acid-water is 0.05% to 1.0%; the reversed-phase C18 chromatographic column is equilibrated to the baseline level; the second component containing the first peak obtained from step b1 is injected into the reversed-phase C18 chromatographic column for the separation, and the second peak of the granatin A is collected to obtain a fourth component; the third component containing the second peak obtained from the step b1 is injected into the reversed-phase C18 chromatographic column for the separation, and the first peak of the granatin A is collected to obtain a fifth component; the fourth component and the fifth component are combined, concentrated and dried by the rotary evaporator at the temperature of 30° C. to 50° C., and dissolved by adding 1 mL of the first mobile phase to obtain a sixth component for a later use;

d1. the reversed-phase C18 chromatographic column is connected to the high performance liquid phase chromatograph equipped with the dual-channel ultraviolet detector, and the wavelength of the high performance liquid phase chromatograph is adjusted to 254 nm and 366 nm, the column temperature is controlled at 7° C. to −2° C., and the flow rate is controlled at 0.3 mL/min-4.7 ml/min; the acetonitrile and the formic acid-water are mixed through the solvent pump of the high performance liquid phase chromatograph and used as the first mobile phase, wherein a content of the acetonitrile is controlled at 10% to 30%, and the formic acid content in the formic acid-water is 0.05% to 1.0%; the reversed-phase C18 chromatographic column is equilibrated to the baseline level, the sixth component obtained from step c1 is injected into the reversed-phase C18 chromatographic column for the separation; a seventh component of the granatin A is collected, concentrated to 1 mL by the rotary evaporator at the temperature of 30° C. to 50° C., and freeze-dried under the vacuum to get the high-purity granatin A as a light yellow powder, a purity of the light yellow powder is identified by the high performance liquid phase chromatograph;

using the mixture of the methanol-acetonitrile-formic acid-water as the second mobile phase:

a2. the reversed-phase C18 chromatographic column is connected to the high performance liquid phase chromatograph equipped with the dual-channel ultraviolet detector, and the wavelength of the high performance liquid phase chromatograph is adjusted to 254 nm and 366 nm, the column temperature is controlled at 30° C., and the flow rate is controlled at 180 mL/min; the methanol and the formic acid-water are mixed through the solvent pump of the high performance liquid phase chromatograph and used as the second mobile phase, wherein the content of the methanol is 20%, and the formic acid content in the formic acid-water is 0.1%; the reversed-phase C18 chromatographic column is equilibrated to the baseline level; 3 g of the pomegranate peel extract is weighed and dissolved in 20 mL of the water, centrifuged to remove the precipitate, and injected into the high performance liquid phase chromatograph for the separation; an eighth component of the granatin A is collected, concentrated to 5 mL by the rotary evaporator at the temperature of 40° C., and freeze-dried under the vacuum to get 230 mg of the yellow solid powder;

b2. a wavelength of a DAD detector is adjusted to 254 nm and 366 nm, the flow rate is controlled at 0.3 mL/min to 2.4 mL/min, and the column temperature is controlled at 7° C. to −30° C.; the methanol, the acetonitrile, and the formic acid-water are mixed through a pump of the high performance liquid phase chromatograph and used as the second mobile phase, wherein the content of the methanol is controlled at 15% to 40%, the content of the acetonitrile is controlled at 5% to 15%, a content of the formic acid-water is controlled at 55% to 80%, and the formic acid content in the formic acid-water is 0.05% to 1.0%; the reversed-phase C18 chromatographic column is equilibrated to the baseline level; 5 mg to 40 mg of a part rich in the granatin A obtained from step a2 is weighed, dissolved in 1 mL of the second mobile phase, and injected into the reversed-phase C18 chromatographic column for the separation; the first peak and the second peak of the granatin A are separately collected to respectively obtain a ninth component and a tenth component, concentrated and dried by the rotary evaporator at the temperature of 30° C. to 50° C., and dissolved by adding 1 mL of the second mobile phase for a later use;

c2. the wavelength of the high performance liquid phase chromatograph is adjusted to 254 nm and 366 nm, the flow rate is controlled at 0.3 mL/min to 2.4 mL/min, and the column temperature is controlled at 7° C. to −30° C.; the methanol, the acetonitrile, and the formic acid-water are mixed through the pump of the high performance liquid phase chromatograph and used as the second mobile phase, wherein the content of the methanol is controlled at 15% to 40%, the content of the acetonitrile is controlled at 5% to 15%, the content of the formic acid-water is controlled at 55% to 80%, and the formic acid content in the formic acid-water is 0.05% to 1.0%; the reversed-phase C18 chromatographic column is equilibrated to the baseline level; the ninth component containing the first peak obtained from step b2 is injected into the reversed-phase C18 chromatographic column for the separation, and the second peak of the granatin A is collected to obtain an eleventh component; the tenth component containing the second peak obtained from the step b2 is injected into the reversed-phase C18 chromatographic column for the separation, and the first peak of the granatin A is collected to obtain a twelfth component; the eleventh component and the twelfth component are combined, concentrated and dried by the rotary evaporator at the temperature of 30° C. to 50° C., and dissolved by adding 1 mL of the second mobile phase to obtain a thirteenth component for a later use;

d2. the reversed-phase C18 chromatographic column is connected to the high performance liquid phase chromatograph equipped with the dual-channel ultraviolet detector, and the wavelength of the high performance liquid phase chromatograph is adjusted to 254 nm and 366 nm, the column temperature is controlled at 7° C. to −2° C., and the flow rate is controlled at 0.3 mL/min to 4.7 mL/min; the acetonitrile and the formic acid-water are mixed through the solvent pump of the high performance liquid phase chromatograph and used as the second mobile phase, wherein the content of the acetonitrile is controlled at 10% to 30%, and the formic acid content in the formic acid-water is 0.05% to 1.0%; the reversed-phase C18 chromatographic column is equilibrated to the baseline level; the thirteen component obtained from step c2 is injected into the reversed-phase C18 chromatographic column for the separation; a fourteenth component of the granatin A is collected, concentrated to 1 mL by the rotary evaporator at the temperature of 30° C. to 50° C., and freeze-dried under the vacuum to get the high-purity granatin A as the light yellow powder, the purity of the light yellow powder is identified by the high performance liquid phase chromatograph;

using the mixture of the acetonitrile and the formic acid-water as the third mobile phase:

a3. the reversed-phase C18 chromatographic column is connected to the high performance liquid phase chromatograph equipped with the dual-channel ultraviolet detector, and the wavelength of the high performance liquid phase chromatograph is adjusted to 254 nm and 366 nm, the column temperature is controlled at 30° C., and the flow rate is controlled at 180 mL/min; the methanol and the formic acid-water are mixed through the solvent pump of the high performance liquid phase chromatograph and used as the third mobile phase, wherein the content of the methanol is 20%, and the formic acid content in the formic acid-water is 0.1%; the reversed-phase C18 chromatographic column is equilibrated to the baseline level; 3 g of the pomegranate peel extract is weighed and dissolved in 20 mL of the water, centrifuged to remove the precipitate, and injected into the high performance liquid phase chromatograph for the separation; a fifteenth component of the granatin A is collected, concentrated to 5 mL by the rotary evaporator at the temperature of 40° C., and freeze-dried under the vacuum to get 230 mg of the yellow solid powder;

b3. the wavelength of the high performance liquid phase chromatograph is adjusted to 254 nm and 366 nm, the flow rate is controlled at 0.3 mL/min to 2.4 mL/min, the column temperature is controlled at 7° C. to −2° C.; the acetonitrile and the formic acid-water are mixed through the pump of the high performance liquid phase chromatograph and used as the third mobile phase, wherein the content of the acetonitrile is controlled at 10% to 30%, the content of the formic acid-water is controlled at 70% to 90%, and the formic acid content in the formic acid-water is 0.05% to 1.0%; the reversed-phase C18 chromatographic column is equilibrated to the baseline level; 5 mg to 40 mg of a part rich in the granatin A obtained from step a3 is weighed, dissolved in 1 mL of the third mobile phase, and injected into the reversed-phase C18 chromatographic column for the separation; the first peak and the second peak of the granatin A are separately collected to respectively obtain a sixteenth component and a seventeenth component, concentrated and dried by the rotary evaporator at the temperature of 30° C. to 50° C., and dissolved by adding 1 mL of the third mobile phase for a later use;

c3. the wavelength of the high performance liquid phase chromatograph is adjusted to 254 nm and 366 nm, the flow rate is controlled at 0.3 mL/min to 2.4 mL/min, the column temperature is controlled at 7° C. to −2° C.; the acetonitrile and the formic acid-water are mixed through the pump of the high performance liquid phase chromatograph and used as the third mobile phase, wherein the content of the acetonitrile is controlled at 10% to 30%, the content of the formic acid-water is controlled at 70% to 90%, and the formic acid content in the formic acid-water is 0.05% to 1.0%, the reversed-phase C18 chromatographic column is equilibrated to the baseline level; the sixteenth component containing the first peak obtained from step b3 is injected into the reversed-phase C18 chromatographic column for the separation, and the second peak of the granatin A is collected to obtain an eighteenth component; the seventeenth component containing the second peak obtained from the step b3 is injected into the reversed-phase C18 chromatographic column for the separation, and the first peak of the granatin A is collected to obtain a nineteenth component; the eighteenth component and the nineteenth component are combined, concentrated and dried by the rotary evaporator at the temperature of 30° C. to 50° C., and dissolved by adding 1 mL of the third mobile phase to obtain a twentieth component for a later use;

d3. the reversed-phase C18 chromatographic column is connected to the high performance liquid phase chromatograph equipped with the dual-channel ultraviolet detector, and the wavelength of the high performance liquid phase chromatograph is adjusted to 254 nm and 366 nm, the column temperature is controlled at 7° C. to −2° C., and the flow rate is controlled at 0.3 mL/min to 4.7 mL/min; the acetonitrile and the formic acid-water are mixed through the solvent pump of the high performance liquid phase chromatograph and used as the third mobile phase, wherein the content of the acetonitrile is controlled at 10% to 30%, and the formic acid content in the formic acid-water is 0.05% to 1.0%; the reversed-phase C18 chromatographic column is equilibrated to the baseline level; the twentieth component obtained from step c3 is injected into the reversed-phase C18 chromatographic column for the separation; a twenty-first component of the granatin A is collected, concentrated to 1 mL by the rotary evaporator at the temperature of 30° C. to 50° C., and freeze-dried under the vacuum to get the high-purity granatin A as the light yellow powder, the purity of the light yellow powder is identified by the high performance liquid phase chromatograph.

2. The method for preparing the high-purity granatin A according to claim 1, wherein in the step b1, the step c1, and the step d1 when using the mixture of the methanol and the formic acid-water as the first mobile phase, the formic acid content in the formic acid-water is controlled at 0.1% to 0.3%.

3. The method for preparing the high-purity granatin A according to claim 1, wherein in the step b1, the step c1, and the step d1 when using the mixture of the methanol and the formic acid-water as the first mobile phase, a temperature for concentration is controlled at 30° C. to 37° C.; in the step b2, the step c2, and the step d2 when using the mixture of the methanol-acetonitrile-formic acid-water as the second mobile phase, a temperature for concentration is controlled at 30° C. to 37° C.; or in the step b3, the step c3, and the step d3 when using the mixture of the acetonitrile and the formic acid-water as the third mobile phase, a temperature for concentration is controlled at 30° C. to 37° C.

4. The method for preparing the high-purity granatin A according to claim 1, wherein during a separation process when using the mixture of the methanol and the formic acid-water as the first mobile phase or using the mixture of the methanol-acetonitrile-formic acid-water as the second mobile phase, the column temperature in the step b1, the step b2, the step c1, and the step c2 is controlled at −15° C. to −25° C., and the column temperature in step d1 and step d2 is controlled at 2° C. to −2° C., or during the separation process when using the mixture of the acetonitrile and the formic acid-water as the third mobile phase, the column temperature in the step b3 and the step c3 is controlled at 2° C. to −2° C., and the column temperature in step d3 is controlled at 2° C. to −2° C.

\* \* \* \* \*